United States Patent [19]

Klemann et al.

[11] Patent Number: 5,064,668
[45] Date of Patent: * Nov. 12, 1991

[54] PROCESS FOR SEPARATION OF STEROL COMPOUNDS FROM FLUID MIXTURES

[75] Inventors: Lawrence P. Klemann, Somerville; John W. Finley, Whippany, both of N.J.

[73] Assignee: Nabisco Brands, Inc., Parsippany, N.J.

[*] Notice: The portion of the term of this patent subsequent to Nov. 5, 2008 has been disclaimed.

[21] Appl. No.: 373,823

[22] Filed: Jun. 30, 1989

[51] Int. Cl.$^5$ .............................. A23C 9/14; C12H 1/04
[52] U.S. Cl. .................................... 426/271; 210/679; 210/690; 210/691; 426/330; 426/330.1; 426/330.6; 426/417; 426/614
[58] Field of Search ................ 426/417, 330, 330.1, 426/330.6, 271, 614; 210/679, 690, 691, 694

[56] References Cited

U.S. PATENT DOCUMENTS

| | | |
|---|---|---|
| 3,527,712 | 4/1970 | Renn et al. |
| 3,814,255 | 6/1974 | Smernoff ..................... 210/31 |
| 3,817,706 | 6/1974 | Smith . |
| 3,997,298 | 12/1976 | McLafferty et al. ............. 23/253 R |
| 4,076,930 | 2/1978 | Ellingboe ..................... 536/1 |
| 4,297,220 | 10/1981 | Meitzner et al. ............... 210/680 |
| 4,333,959 | 6/1982 | Bracco et al. ................. 426/614 |
| 4,431,544 | 2/1984 | Atkinson et al. ............... 210/635 |
| 4,454,056 | 6/1984 | Kittelmann et al. ............ 252/174 |
| 4,544,485 | 10/1985 | Pinkerton et al. ............. 210/502.1 |
| 4,637,861 | 1/1987 | Krull et al. .................. 204/11 T |
| 4,665,110 | 5/1987 | Zones ........................ 423/277 |
| 4,681,870 | 7/1987 | Balint et al. ................ 502/403 |
| 4,692,280 | 9/1987 | Spinelli et al. .............. 260/420 |

FOREIGN PATENT DOCUMENTS

| | | |
|---|---|---|
| 2601959 | 1/1988 | France . |
| 63-39991 | 9/1988 | Japan . |
| 8802989 | 10/1988 | PCT Int'l Appl. . |

OTHER PUBLICATIONS

APS Computer Printout 1/28/91, pp. 1-4.
Yamamura et al., "Guest Selective Molecular Recognition by an Octadecylsilyl Monolayer Covalently Bound on an SnO$_2$ Electrode", J. Chem. Soc., Chem. Communications, 1988, pp. 79-81.
Food Science and Technology Abstracts, 6, Abstract 8 A 374 (1974).
Food Science and Technology Abstracts, 18(1), Abstract 1 H 46 (1986).
Food Science and Technology Abstracts, 18(2), Abstract 2 M 118 (1986).
Food Science and Technology Abstracts, 18(3), Abstract 3 T 70 (1986).
Food Science and Technology Abstracts, 18(8), Abstract 8 V 321 (1986).
Food Science and Technology Abstracts, 19(3), Abstract 3 V 102 (1987).

(List continued on next page.)

Primary Examiner—Donald E. Czaja
Assistant Examiner—Evan Federman

[57] ABSTRACT

Cholesterol and other sterols are separated from fluid mixtures, especially foodstuffs such as egg yolk, using a surface-modified adsorbent which selectively adsorbs the sterols. The surface-modified adsorbent is prepared by (a) treating an adsorbent with a sterol compound so that the sterol compound becomes adsorbed on the adsorbent surface; (b) treating the sterol-modified adsorbent with a surface-modifying agent, this surface-modifying agent having a reactive group capable of reacting with the surface of the adsorbent, and an elongate hydrophobic portion, so that the surface of the adsorbent not covered by the adsorbed sterol compound reacts with the surface-modifying agent; and (c) desorbing the sterol compound from the adsorbent. A surface-modified adsorbent prepared in this way may also be used to remove sterols from solvents (such as carbon dioxide) which have themselves been used to extract sterols from foodstuffs, thus avoiding the need to distil and condense the solvent before it is recycled to treat further batches of the foodstuff.

43 Claims, 1 Drawing Sheet

OTHER PUBLICATIONS

Behnke et al., "Filipin as a Cholesterol Probe II. Filipin Cholesterol Interaction in Red Blood Cell Membranes", Eur. J. Cell Biol., 35(2) 200-215 (1984).
Lok et al., "The role of organic molecules in molecular sieve synthesis", Zeolites, 3, 282 (1983).
Lehn, "Supramolecular Chemistry: receptors, catalysts and carriers", Science, 227, 849 (1985).
Wehr, "Sample preparation and column regeneration in biopolymer separation", J. Chrom. 418, 27 (1987).
Evershed et al., "Strategy for the analysis of steryl esters from plant and animal tissues", J. Chrom. 400 187 (1987).
Takase et al., "Characterization of Sterol Carrier Protein Binding with 7-Dehydrocholesterol and Vitamin $D_3$", J. Nutr. Sci. Vitaminol. 23, 53-61 (1977).
LeFevre et al., "Adrenal Cholesterol-Binding Protein: Properties and Partial Purification", Febs. Letters, 89(2), 287-292 (1978).
Higuchi et al., "Comparative Studies on a Heat Stable Cholesterol-Binding Protein in Dental Cyst Fluid and Serum", Int. J. Biochem., 13 777-782 (1981).
Chen et al., "Prostate Protein Isolation and Characterization of the Polypeptide Components and Cholesterol Binding", J. Biol Chem. 257(1), 116-121 (1982).
Sziegoleit, "Purification and Characterization of a Cholesterol-Binding Protein from Human Pancreas", Biochem. J., 207, 573-582 (1982).
Regenass-Klitz et al., "Specific Binding of Cholesterol to Chromatin Prepared from Mouse Spleen Cells", Can. J. Biochem. Cell Biol., 62, 94-99 (1984).
Bornig et al., "Staining of Cholesterol with the Fluorescent Antibiotic Filipin", Acta Histochem., 50, 110-115 (1974).
Patterson, "Effects of Experimental Conditons on the Interaction of Filipin and Pimaricin with Cholesterol", Antibiot. (Tokyo) 32(11) 1193-2000 (1979).
"Sephadex Column Chromatography as an Adjunct to Competitive Protein Binding Assays of Steroids", Nature New Biology, 232, 21-24 (Jul. 1971).
"Evaulation of a High-Performance Liquid Chromatogaphy Method for Isolation and Quantitation of Cholesterol and Cholesterol Ester," Carroll et al., J. Lipid Res, 22(2), 359-363 (Feb. 1981).
"The Role of a Carrier Protein in Cholesterol and Steroid Hormone Synthesis by Adrenal Enzymes 1, 2, "
Kan et al., Biochemical and Biophysical Research Communications, 48(2), 423-429 (1972).
Food Science and Technology Abstracts, 20(8), Abstract 8 E 4 (1988).
Food Science and Technology Abstracts, 20(8), Abstract 8 N 26 (1988).
Food Science and Technology Abstracts, 20(12), Abstract 12 N 16 (1988).
Food Science and Technology Abstracts, 20(11), Abstract 11 V 36 (1988).
Deutsch et al., "Isolation of Lipids from Plasma by Affinity Chromatography", Biochemical and Biophysical Research Communications, 50(3), 758-764 (1973).
"Affinity Chromatography," Parikh et al., Chemical & Engineering News, Aug. 26, 1985, pp. 17-32.
Food Science and Technology Abstracts, 19(4), Abstract 4 E 11 (1987).
Food Science and Technology Abstracts, 19(4), Abstract 4 N 36 (1987).
Food Science and Technology Abstracts, 19(6), Abstract 6 G 29 (1987).
Food Science and Technology Abstracts, 19(12), Abstract 12 H 200 (1987).
Food Science and Technology Abstracts, 20(2), Abstract 2 E 35 (1988).
Food Science and Technology Abstracts, 20(3), Abstract 3 N 31 (1988).
Food Science and Technology Abstracts, 20(4), Abstract 4 E 36 (1988).
Food Science and Technology abstracts, 20(5), Abstract 5 T 57 (1988).
Food Science and Technology Abstracts, 20(6), Abstract 6 V 143 (1988).
Food Science and Technology Abstracts, 20(7), Abstract 7 N 60 91988).
Chemical Abstracts, 108, 127,097r.
Swientek, Supercritical fluid extraction separates components in foods, Food Processing (48), 7, 32, 34, 36 (1987).
Geyer et al., "Filipin—A Histochemical Fluorochrome for Cholesterol", Acta Histochem [Suppl] (Jena), 15, 207-212 (1975).
Bittman et al., "Determination of cholesterol Asymmetry by Rapid Kinetics of Filipin-Cholesterol Association: Effect of Modification in Lipids and Proteins", Biochemistry 20(9), 2425-2432 (1981).

PROCESS FOR SEPARATION OF STEROL COMPOUNDS FROM FLUID MIXTURES

FIELD OF THE INVENTION

This invention relates to processes for separation of sterol compounds (a term which is used herein to refer to cholesterol and its derivatives, metabolites and enzymatic degradation products, and also includes plant sterols and the oxidized forms of such plant sterols) from fluid mixtures. The process is especially, though not exclusively, useful for the separation of sterol compounds from egg yolks, but may also be used to separate such compounds from fish oil, butter oil, lard, tallow and other fatty materials.

BACKGROUND OF THE INVENTION

Cholesterol and other sterols are natural constituents of many foodstuffs. However, the presence of large amounts of cholesterol and other sterols in the human body is considered by physicians to be deleterious, since cholesterol has been implicated as a factor in a number of diseases, especially atherosclerosis, in which deposits containing a high proportion of cholesterol are deposited in blood vessels. Accordingly, it is common practice for physicians to recommend to patients who have suffered a heart attack, or who display a likelihood of, or documented, hypercholesterolemia, that the patients reduce their cholesterol intake from foodstuffs.

However, cholesterol is found in significant quantities in a wide variety of foodstuffs, being present in most animal fats, and consequently restrictions upon the cholesterol intake of patients necessitate prohibiting or greatly reducing the consumption of many foodstuffs, a step which many patients are reluctant to take, and which may introduce complications in ensuring that the patients receive a properly balanced diet meeting all nutritional requirements. Moreover, cholesterol is present in large amounts in egg yolks. Eggs are used in some processed food applications and formulas as a binding agent, and if the eggs are eliminated it is difficult to produce a foodstuff having the expected texture. Finally, the public has recently become increasingly aware of the health risks associated with consumption of cholesterol, so that even persons who are not under medical treatment for conditions in which cholesterol is implicated are voluntarily attempting to reduce their cholesterol consumption, and the food industry is beginning to label foods to show their cholesterol content. Thus, many people may avoid foods known to be high in cholesterol and seek substitutes.

In order to help people to reduce their cholesterol consumption without major modifications in their diet (and thus help to ensure, inter alia, that people who must follow a low cholesterol diet for medical reasons do in fact keep to such a diet), it is desirable to provide some method by which cholesterol and other sterol compounds (many of which can be metabolized to cholesterol or its derivatives) can be extracted from various foodstuffs, thereby producing low-cholesterol versions of such foodstuffs which can be consumed in place of the original, high-cholesterol foodstuffs. However, the requirements for such a sterol-removal process are exacting. The process must not, of course, introduce into the foodstuff any material which is not generally recognized as safe for use in foodstuffs. The process should remove from the foodstuff not only cholesterol itself but also cholesterol derivatives and other sterol compounds which can be metabolized in the body to cholesterol or derivatives thereof, and which thus affect cholesterol levels in the body. Furthermore, the process should leave the foodstuff in a form which is as close as possible to that of the original, high-cholesterol foodstuff. For example, when used on egg yolks, the cholesterol-removal process should maintain the high viscosity of the egg yolks since this high viscosity is needed for proper binding action when the treated egg yolk is used in the production of baked goods, liquid egg substitutes, margarines etc., and should not denature the proteins present in the egg yolk. Finally, the cholesterol-removal process should preserve the nutritional value of the foodstuff, and not, for example, remove vitamins and other important constituents of the foodstuff. In particular, since cholesterol is frequently present in foodstuffs in the form of various complexes, it is desirable that a cholesterol-removal process not remove the other natural materials found to be associated with the cholesterol.

Numerous attempts have previously been made to provide a cholesterol-removal process which meets these exacting criteria. For example, attempts have been made to remove cholesterol, and other undesirable food components, by extracting the cholesterol from the foodstuff with liquid, usually supercritical, carbon dioxide. Such carbon dioxide extraction processes suffer from the disadvantage that they must be operated under pressure to keep the carbon dioxide in the liquid phase, which increases the cost of the apparatus required. In addition, such carbon dioxide extraction processes may not be very selective in removing cholesterol, and thus may remove valuable constituents of the foodstuff. In addition, the properties of some foodstuffs may be altered disadvantageously by contact with liquid carbon dioxide; for example, in some cases the carbon dioxide may remove flavoring and/or odiferous components, thereby affecting the taste and/or smell of the treated foodstuff.

For example, U.S. Pat. No. 4,692,280, issued Sept. 8, 1987, to Spinelli et al., describes a process for the purification of fish oils in which the oil is extracted with supercritical carbon dioxide to remove cholesterol, together with odoriferous and volatile impurities.

Food Science and Technology Abstracts, 6, Abstract 8 A 374 (1974) (Abstract of Food Technology 28(6), 32–34, 36, 38 (1974)) describes a pilot plant for extraction of volatile substances from liquid and solid foods using liquid carbon dioxide as the solvent.

Food Science and Technology Abstracts, 18(1), Abstract 1 H 46 (1986) (Abstract of German Offenlegungsschrift 33 31 906 (1985)) describes extraction of caffeine from coffee beans using supercritical carbon dioxide as the solvent.

Food Science and Technology Abstracts, 18(2), Abstract 2 M 118 (1986) (Abstract of Agricultural and Biological Chemistry, 49(8), 2367–72 (1985)) describes extraction of oils from wheat germ using supercritical carbon dioxide as the solvent.

Food Science and Technology Abstracts, 18(3), Abstract 3 T 70 (1986) (Abstract of Indian Food Industry, 3(2), 48–51 (1084)) describes extraction of flavor components from natural products using both liquid and supercritical carbon dioxide.

Food Science and Technology Abstracts, 18(8), Abstract 8 V 321 (1986) (Abstract of French Patent Application Publication No. 2,563,702 (1985)) describes extraction of essential oils from blackcurrant buds using supercritical carbon dioxide.

Food Science and Technology Abstracts, 19(3), Abstract 3 V 102 (1987) (Abstract of United Kingdom Patent Application Publication No. 2,173,985 (1986)) describes extraction of aroma materials from dried plant material, which has been milled and soaked in ethanol, using a continuously flowing stream of carbon dioxide at a temperature below its critical temperature. The plant material can be used for extraction of tannin, caffeine and nicotine from tea, coffee and tobacco respectively.

Food Science and Technology Abstracts, 19(4), Abstract 4 E 11 (1987) (Abstract of Food Manufacture, 61(12), 58 (1986)) describes the use of liquid, supercritical or high pressure carbon dioxide in various processes, including decaffeination of coffee, preparation of hop extract for brewing, extraction of essential oils, defatting of potato chips, and fractionation of fish oils.

Food Science and Technology Abstracts, 19(4), Abstract 4 N 36 (1987) (Abstract of Seafood Export Journal 18(9), 10–13 (1986)) describes extraction of oils from Antarctic krill using supercritical carbon dioxide.

Food Science and Technology Abstracts, 19(6), Abstract 6 G 29 (1987) (Abstract of Nahrung 30(7), 667–671 (1986)) describes defatting of baker's yeast protein extracts by extraction with supercritical carbon dioxide.

Food Science and Technology Abstracts, 19(12), Abstract 12 H 200 (1987) (Abstract of Journal of Food Science and Technology 23(6), 326–328 (1986)) describes decaffeination of coffee using supercritical carbon dioxide as solvent.

Food Science and Technology Abstracts, 20(2), Abstract 2 E 35 (1988) (Abstract of Voedingsmiddelentechnologie 20(7), 32–35 (1987)) describes various uses of extraction with supercritical carbon dioxide in the food industry, including extraction of oils and fats, preparation of hop extracts, fractionation of oils and fats, extraction of essential oils, and elimination of undesirable constituents, for example decaffeination of coffee.

Food Science and Technology Abstracts, 20(3), Abstract 3 N 31 (1988) (Abstract of Agricultural and Biological Chemistry, 51(7), 1773–77 (1987)) describes fractional extraction of rice bran oil with supercritical carbon dioxide.

Food Science and Technology Abstracts, 20(4), Abstract 4 E 36 (1988) (Abstract of Food Trade Review 57(9), 461, 463–464 (1987)) describes the use of supercritical carbon dioxide as an extractant of vegetable oils.

Swientek, Supercritical fluid extraction separates components in foods, Food Processing 48(7), 32, 34, 36 (1987)) describes the use of supercritical fluid extraction in the food industry, including removal of cholesterol from milkfat, extraction of omega-3-fatty acids from fish oil, and extraction of oil seeds.

Food Science and Technology Abstracts, 20(5), Abstract 5 T 58 (1988) (Abstract of Sciences des Aliments 7(3), 481–498 (1987)) describes the preparation of a black pepper oleoresin by extraction of the pepper with supercritical carbon dioxide or with a carbon dioxide/ethanol blend.

Food Science and Technology Abstracts, 20(6), Abstract 5 T 58 (1988) (Abstract of West German Patentschrift 30 11 185 (1988)) describes the purification of lecithin for food or pharmaceutical use by extraction with supercritical carbon dioxide.

Food Science and Technology Abstracts, 20(7), Abstract 7 N 60 (1988) (Abstract of Journal of the American Oil Chemists' Society 65(1), 109–117 (1988)) describes fractionation of menhaden oil ethyl esters using supercritical fluid carbon dioxide to produce cholesterol-rich and cholesterol-depleted fractions.

Food Science and Technology Abstracts, 20(8), Abstract 8 E 4 (1988) (Abstract of Bio/Technology 6(4), 393–394, 396 (1988)) describes industrial scale use of supercritical fluid extraction with retrograde condensation to recover the condensation to recover the solute. Applications of this technology include extraction of caffeine from coffee, removal of toxic thujone from wormwood flavoring, extraction of triacylglycerols from many sources, extraction of sterols and steroids from poultry and meat products, and extraction of essential oils from thyme.

Food Science and Technology Abstracts, 20(8), Abstract 8 N 26 (1988) (Abstract of Energy in Agriculture 6(3), 265–271 (1987)) describes extraction of peanut oil using supercritical carbon dioxide.

Food Science and Technology Abstracts, 20(12), Abstract 12 N 16 (1988) (Abstract of Dissertation Abstracts International, B 48(9), 2632 (1988)) describes extraction of oil from Canola (*Brassica naous* or *B. campestris*) seed using supercritical carbon dioxide.

In addition to the problems previously mentioned, prior art processes for extraction of cholesterol and other components from foodstuffs using liquid or supercritical carbon dioxide normally involve high energy costs, since not only is the carbon dioxide itself costly, but before the carbon dioxide can be recycled to treat further batches of the foodstuff, the dissolved cholesterol is removed by allowing the carbon dioxide to evaporate (technically speaking, supercritical carbon dioxide is simply decompressed) to produce gaseous carbon dioxide and a liquid or solid residue, and the gaseous carbon dioxide must then be recompressed (and if necessary liquified) to produce liquid or supercritical carbon dioxide; this recompression is energy intensive. Accordingly, the cost of extraction of cholesterol from foodstuffs using liquid or supercritical carbon dioxide could be reduced if a way could be found to remove cholesterol from the carbon dioxide without the need to evaporate and recompress this material. This invention provides such a process for removal of cholesterol or other sterol compounds from carbon dioxide or other solvent laden with these sterols.

Furthermore, a wide variety of techniques have previously been employed in the extraction of materials from, and the purification of, complex organic mixtures, and examples of such techniques will now be given.

Food Science and Technology Abstracts, 20(11), Abstract 11 V 36 (1988) (Abstract of International Patent Application Publication No. WO 88/02989 (1988)) describes a process for the simultaneous deodorization and cholesterol reduction of fats and oils by deaeration, mixing with steam, heating, flash vaporizing, thin-film stripping with countercurrent steam, and cooling (all the preceding steps being performed under vacuum), and storage under oxygen-free conditions. This process demonstrates the difficulty in removing cholesterol from a foodstuff while maintaining the expected flavor thereof.

Deutsch et al., "Isolation of Lipids from plasma by Affinity Chromatography", Biochemical and Biophysical Research Communications, 50(3), 758–764 (1973) describes the extraction of certain lipid fractions from plasma by affinity chromatography. Cross-linked agarose (SEPHAROSE 4B) was activated by the well known cyanogen bromide method of Cuatrecasas. Dodecylamine was then covalently bound to the activated agarose to provide the adsorbent. Plasma was mixed with the adsorbent, whereupon the adsorbent was then filtered and washed. Lipids were then eluted off the adsorbent with ethanol. This procedure removed approximately 50% of the triglycerides and nearly all of the cholesterol and lipoproteins. This procedure of would be expected to work on dairy products such as milk. However, milk products require triglycerides and lipoproteins for integrity, mouthfeel and taste. For example, the fat in butter is necessary for cooking. Accordingly, this procedure would alter milk products such that much of the fat and nutrients would be removed.

U.S. Pat. No. 4,431,544 to Atkinson et al. teaches a high pressure liquid affinity chromatography by which biomolecules are extracted from solution and purified. Ligands are attached to matrices by way of spacer arms to provide the adsorbent. The matrix may be cross-linked agarose, and the spacer arms may be polyarginine or polylysine. The extraction of cholesterol from dairy products through this general-ligand affinity chromatography process is not feasible because of the broad specificity, and the toxic nature of the crosslinking agents. For example, cyanogen bromide is recommended for crosslinking a diaminoalkane spacer arm to cross-linked agarose. Cyanogen bromide is a well known cross-linking agent; however, cyanate groups are formed on the agarose hydroxyl groups not bound to spacer arms or ligands.

There is evidence that all systems using cyanogen bromide for coupling result in a significant degree of solubilization or leakage of the immobilized ligand. Parikh and Cuatrecasas discuss the problems associated with cyanogen bromide in their paper "Affinity Chromatography," Parikh et al., Chemical & Engineering News, Aug. 26, 1985, pages 17-32. Single point attachment of the ligand can result in a leakage of 1 ppm. Leakage can be reduced but evidently not eliminated. While the level of cyanide salts is less than the lethal dose of 0.1 milligrams percent, the possibility of cyanide contamination in food products should be avoided.

Heterogeneous mixtures of biomolecules may also be separated by differential migration chromatography, in which separation is effected by the differential migration of molecules through a filter material. The solute molecules migrate through the filter material at different rates due to different attractions occurring between the filter material and charges and/or functional groups on the solute molecules; the solute molecules are not actually retained on the filter material.

U.S. Pat. No. 4,544,485 to Pinkerton et al. teaches a high-pressure liquid chromatography process in which the packing material discriminates between analyte species on the basis of their different interactions with hydrophobic internal surfaces versus hydrophilic external surfaces. The hydrophobic surface may have lysine or arginine covalently bound to glyceroylpropyl groups on the support packing surface via hydroxy functionalities. The material is useful for separating small hydrophobic molecules (e.g., drugs) from protein-containing biological matrices.

U.S. Pat. No. 4,076,930 to Ellingboe teaches a column packing material which may be used to separate cholesterol, among other molecules. The material comprises hydroxyalkyl ethers of hydroxyalkoxy polysaccharides. Hydrocarbon radicals attached by ether linkages confer strongly lipophilic solvation characteristics.

U.S. Pat. No. 3,814,255 to Smernoff teaches a triglyceride cholesterol analysis in which the column material comprises activated porous inorganic oxide particles.

U.S. Pat. No. 3,817,706 to Smith teaches a fluorescence quantitative thin layer chromatographic method in which an adsorbent such as alumina, silica acid or silica gel is used on a plate to separate analytes including cholesterol. These analytes are stained and quantified.

U.S. Pat. No. 3,997,298 to McLafferty et al. teaches a ligand chromatography-mass spectrometry system and method. Quantitative and qualitative analysis of analytes, including cholesterol, is effected using a system coupling a liquid chromatography column to a mass-spectrometer chemical ionization detector.

Netherlands Patent Application No 8304501A to Utrecht teaches a column structure for a high-pressure liquid chromatography procedure. Steroids and lipids may be separated.

U.S. Pat. No. 3,527,712 to Renn et al. teaches a dried agarose gel, a method of preparation thereof and production of an aqueous agarose gel. A dissolved macromolecular hydrocolloid is introduced into the porous structure of an agarose gel. The hydrocolloid may include cellulose derivatives, amides or polysaccharides. The material is useful for sorting molecules having molecular weights greater than 200,000, when present at concentrations of less than 5 percent. Separation of smaller molecules than molecular weight 200,000 is possible when the material is present at concentrations greater than 5 percent.

"Sephadex Column Chromatography as an Adjunct to Competitive Protein Binding Assays of Steroids," Nature New Biology, 232, 21-24 (July 1971), teaches using a column packing material comprising SEPHADEX LH-20 to separate heterogeneous mixtures of steroids. The alkylation of the hydroxyl groups of SEPHADEX makes it possible to elute with organic as well as aqueous solvents.

"Evaluation of a High-Performance Liquid Chromatography Method for Isolation and Quantitation of Cholesterol and Cholesterol Esters," Carroll et al., J. Lipid Res, 22(2), 359-363 (Feb. 1981), discusses using high pressure liquid chromatography for analyzing cholesterol.

Differential migration chromatographic techniques, including those outlined above, provide high resolution separation of solute materials. With this procedure it is possible to separate closely related compounds and thus enable qualitative and quantitative analysis of these compounds; however, such techniques are not commercially feasible for the extraction of cholesterol from foodstuffs because too many different solutes would be separated, the foodstuff would be highly diluted, and post-treatment of the foodstuff filtrate would be cumbersome.

Various potential methods for the separation of cholesterol from foodstuffs, including the affinity chromatography methods discussed above, depend upon the selection of a material which has a strong affinity for cholesterol. A number of substances are known to have such an affinity. These include macromolecular carrier proteins, specific amino acids, specific polypeptides, and polyene antibiotics.

The most logical substances for binding cholesterol would be those substances involved in cholesterol transport within biological systems. A number of papers discuss the isolation and character of these cholesterol carrier proteins. Examples of such papers include:

In "The Role of a Carrier Protein in Cholesterol and Steroid Hormone Synthesis by Adrenal Enzymes 1, 2, "Kan et al., Biochemical and Biophysical Research Communications, 48(2), 423–429 (1972). The adrenal glands are shown to contain a sterol carrier protein (SCP) similar to that of liver-SCP. The paper points out that SCP is required for cholesterol synthesis from squalene and steroid synthesis from cholesterol. SCP is thought to be present in yeast and protozoa.

Takase et al., "Characterization of Sterol Carrier Protein Binding with 7-Dehydrocholesterol and Vitamin D", J. Nutr. Sci. Vitaminol., 23, 53–61, (1977) discusses the role of Vitamin D3 in the relationship between rat liver sterol carrier protein (SCP) and cholesterol.

LeFevre et al., "Adrenal Cholesterol-Binding Protein: Properties and Partial Purification", Febs. Letters, 89(2), 287–292 (1978) discusses a heat-stable protein (CPB) present in the cytosol of adrenal glands, testes and ovaries which specifically binds tritiated cholesterol. A case is made differentiating the CPB from the known sterol-carrier protein present in liver.

Higuchi et al., "Comparative Studies on a Heat-Stable Cholesterol-Binding Protein in Dental Cyst Fluid and Serum", Int. J. Biochem., 13, 777–782 (1981) presents data indicating that dental cyst fluid contains a heat-stable cholesterol-binding protein (CPB) factor. A heated supernatant fraction of cyst fluid is reacted with a $C^{14}$ labeled cholesterol. A SEPHADEX column is used to separate the bound cholesterol from the free cholesterol. The concentration of bound cholesterol is determined by plotting the radioactivity.

Chen et al., "Prostate Protein: Isolation and Characterization of the Polypeptide Components and Cholesterol Binding", J. Biol. Chem., 257(1), 116–121 (1982) presents data concerning α-protein, a major protein in rat prostate secretions which originates in the rat ventral prostate o-Protein is shown to bind cholesterol.

Sziegoleit, "Purification and Characterization of a Cholesterol-Binding Protein from Human Pancreas," Biochem. J., 207, 573–582 (1982) describes a cholesterol binding protein discovered in excreted lavage fluids. Immunologic analysis of the gut specific protein shows the organ of origination to be the pancreas. The protein not only binds cholesterol, but also the bile salt deoxycholate. The protein comprises a single polypeptide chain having a molecular weight of 28,000. The isoelectric point is at pH 4.9.

Regenass-Klotz et al., "Specific Binding of cholesterol to Chromatin Prepared from Mouse Spleen Cells", Can. J. Biochem. Cell Biol., 62, 94–99 (1984) presents data showing that cholesterol specifically binds to the chromatin of mouse splenic lymphocytes. The evidence points to the cholesterol actually binding to a high molecular weight protein in the chromatin preparation and not to deoxyribonucleic acid.

The carrier proteins discussed above show great affinity for cholesterol and would theoretically provide specific ligands for affinity chromatography; the binding site of any of these proteins could be immobilized and used for liquid chromatography to specifically remove cholesterol. However, the binding site is only a small part of the protein molecule, and thus a large mass of protein would be required to remove a small amount of cholesterol. In addition, if the natural protein is employed, the possibility of contaminants causing hepatitis and other viral diseases is always present. Consequently, in practice these methods are entirely unacceptable for use in food processing.

Klimov et al., "Interaction of Cholesterol with Polypeptides and Amino Acids", documents certain binding sites on amino acids and polypeptides which bind cholesterol. This article teaches that amino acids and compounds containing guanidinio groups (e.g., guanidine, metformine, arginine and polyarginine) and gamma-amino groups (e.g., lysine and polylysine) bind to cholesterol; however, there is no suggestion for using these substances for the extraction of cholesterol.

Certain antibiotics have been noted for their ability to bind to cholesterol. Notable amongst these are the polyenes filipin and pimaricin. Bornig et al., "Staining of Cholesterol with the Fluorescent Antibiotic Filipin", Acta Histochem., 50, 110–115 (1974) documents the affinity of filipin for non-esterified cholesterol, and cited its utility as a histochemical stain. Patterson, "Effects of Experimental Conditions on the Interaction of Filipin and Pimaricin with Cholesterol", Antibiot. (Tokyo), 32(11), 1193–2000 (1979) documents pimaricin as having similar properties to filipin. Others have noted the affinity that these polyenes have for cholesterol; see, for example, Geyer et al., "Filipin—A Histochemical Fluorochrome for Cholesterol", Acta Histochem [Suppl] (Jena), 15, 207–212 (1975);

Bittman et al., "Determination of Cholesterol Asymmetry by Rapid Kinetics of Filipin-Cholesterol Association: Effect of Modification in Lipids and Proteins", Biochemistry, 20(9), 2425–2432 (1981); and Behnke et al., "Filipin as a Cholesterol Probe. II. Filipin Cholesterol Interaction in Red Blood Cell Membranes", Eur. J. Cell Biol., 35(2), 200–215 (1984). None of the references suggest the use of pimaricin or filipin as a ligand to remove cholesterol from foodstuffs.

U.S. Pat. No. 4,297,220 to Meitzner et al. (assigned to Rohm and Haas) describes a method for adsorbing an organic material from a fluid or fluid mixture containing the same which comprises contacting the fluid or fluid mixture containing organic material with a macroreticulated crosslinked copolymer having a plurality of microscopic channels resulting from liquid expulsion of a precipitating agent during polymerization of a monomer mixture under suspension polymerization conditions in an aqueous media of (1) a polyvinylidene monomer containing a plurality of ethylenically unsaturated groups in a non-conjugated relationship and (2) at least one monoethylenically unsaturated monomer, said copolymerization taking place in the pressure [sic] of a liquid which is a solvent for the monomer mixture and which does not swell the copolymer resulting from the copolymerization, the liquid being present in an amount sufficient to cause separation of the copolymer from the monomer phase, whereby the organic material is adsorbed by the macroreticulated crosslinked copolymer. The solvent in the polymerization mixture causes the formation of microscopic channels in the copolymer; the purpose of these channels appears to be to facilitate access of the organic material to the ion-exchange centers which are later formed on the copolymer.

U.S. Pat. No. 4,454,056 to Kittelmann et al. describes a process for the modification of the surfaces of zeolites with organosilanes which have at least one alkoxy group bonded to the silicon atom of the silane. The purpose of the surface modification is to prevent agglomeration of the zeolite when it is mixed with a detergent, so that the resultant mixture will remain free-flowing in use.

U.S. Pat. No. 4,637,861 to Krull et al. describes a stabilized, lipid-membrane based device comprising a perturbable lipid membrane and a membrane-stabilizing support. The lipid membrane includes a complexing agent for selectively interacting with a specified chemical species to perturb the lipid membrane, and each membrane-forming lipid includes a polar head group, a first long chain through which the lipid is anchored to a binding site on the support, and a fluidity-providing second chain, which is not attached to the support. The binding sites on the support of spaced apart so as to provide a lipid packing density that permits axial rotation of each membrane-forming lipid about its long, anchored chain, and is yet sufficiently close to provide a high ion impermeability to the unperturbed lipid membrane, but an increased permeability when disturbed. The lipid is preferably anchored to the support via a silicon atom (see column 4, lines 35-42 of the patent).

U.S Pat. No. 4,681,870 to Balint et al. describes a method for preparing an immunoadsorbent material useful for removing IgG and IgG-complexes from biological fluids, this method comprising introducing free amino or carboxyl groups on to a silica matrix, reacting the silica matrix with purified protein A in the presence of a carbodiimide at a pH of 3.5 to 4.5 to covalently link the protein A to the silica matrix through the amino or carboxyl groups, and washing the silica matrix at pH 2.0 to 2.5 to remove loosely bound protein A. In effect, this method simply bonds the protein A, which effects the actual conjugation with the IgG, to a support, thereby providing a solid, insoluble form of the protein A able to function as the active material of a column through which liquid to be stripped of IgG can be run.

U.S. Pat. No. 4,665,110 to Zones describes a process for the synthesis of zeolites using adamantane compounds as templating agents.

Lok et al., "The role of organic molecules in molecular sieve synthesis", Zeolites, 3, 282 (1983), is a review article discussing the relationship between the templating agents used in the synthesis of zeolites, aluminophosphates and similar compounds, and the structures of the molecular sieves produced.

Lehn, "Supramolecular chemistry: receptors, catalysts and carriers", Science, 227, 849 (1985) is a general review of ways in which polymolecular complexes are formed, and includes a discussion of various types of binding by polydentate ligands.

Wehr, "Sample preparation and column regeneration in biopolymer separations", J. Chrom. 418, 27 (1987) discusses the use of selective sorbents, including silica-based sorbents, for selective adsorption and fractionation of polypeptides from complex biological mixtures.

Evershed et al., "Strategy for the analysis of steryl esters from plant and animal tissues", J. Chrom. 400, 187 (1987), discusses various techniques for separation of steryl esters from complex biological mixtures, including various chromatographic separations.

Chemical Abstracts, 108, 112,170k and 150,453n, describe polydentate ligands and cavitands capable of binding metal ions and small guest molecules. There is no disclosure of separation of cholesterol or any closely related material.

Yamamura et al., Guest Selective Molecular Recognition by an Octadecylsilyl Monolayer Covalently Bound on an $SnO_2$ Electrode, J. Chem. Soc., Chem. Commun., 1988, 79-81 discloses the technique of adsorbing a templating molecule, such as a cholesterol derivative, on to a tin oxide surface, modifying the surface using a silane derivative and desorbing the templating molecule in order to provide a modified surface having cavities which will accommodate cholesterol or other molecules which it is desired to adsorb. This paper demonstrates that, when the modified surface is placed in contact with a solution containing cholesterol, access of Vitamin $K_1$ to the electrode is blocked: however, the paper does not indicate how much cholesterol is adsorbed by the modified surface, nor does it suggest that such a modified surface can be used to separate cholesterol from fluid mixtures.

Chemical Abstracts, 108, 127,097r, is an abstract of a more recent paper by the same researchers as the previous paper, and records the use of ODS-modified silica for the adsorption of artificial liposomes.

It has now been discovered that sterol compounds can be removed from fluid mixtures by contacting the mixture with a surface-modified adsorbent. In particular, sterol compounds can be removed from liquid comestible mixtures, including foodstuffs, in a highly selective manner and without substantial changes in the physical and nutritional properties of the foodstuff or other liquid comestible mixture by contacting the mixture with a surface-modified adsorbent. Also, as already indicated, the same surface-modified adsorbents can be used to remove sterol compounds from solvents, such as liquid or supercritical carbon dioxide, which have been used for extraction of foodstuffs, this removal of sterol compounds being effected without the need to evaporate and reliquify the solvent.

SUMMARY OF THE INVENTION

This invention provides a process for separation of at least one sterol compound from a fluid mixture, this process comprising:

(a) treating an adsorbent with a first sterol compound capable of becoming adsorbed on the surface of the adsorbent, this treatment being effected under conditions effective to cause the first sterol compound to become reversibly adsorbed on the surface of the adsorbent, thereby producing a sterol-modified adsorbent;

(b) treating the sterol-modified adsorbent produced in step (a) with an excess of a surface-modifying agent, the surface-modifying agent having a reactive group capable of reacting with the surface of the adsorbent, and an elongate hydrophobic portion, the treatment of the sterol-modified adsorbent with the surface-modifying agent being effected under conditions such that the adsorbed first sterol compound is not desorbed from the adsorbent but substantially all of the reactive sites on the surface of the adsorbent not covered by the adsorbed sterol compound react with the surface-modifying agent;

(c) desorbing the first sterol compound from the adsorbent, thereby producing a surface-modified adsorbent; and (d) contacting the surface-modified adsorbent from step (c) with the fluid mixture under conditions effective to permit adsorption of at least one second sterol compound on to the adsorbent, thereby producing a fluid mixture having a reduced content of the at least one second sterol compound.

The present invention also provides a process for separation of at least one sterol compound from a liquid comestible mixture, this process comprising:

(a) treating silica with a first sterol compound capable of becoming adsorbed on the surface of the silica, this treatment being effected under conditions effective to cause the first sterol compound to become reversibly adsorbed on the surface of the silica, thereby producing a sterol-modified silica;

(b) treating the sterol-modified silica produced in step (a) with an excess of a surface-modifying agent, the surface-modifying agent having a reactive group capable of reacting with the surface of the silica, and an elongate hydrophobic portion, the treatment of the sterol-modified silica with the surface-modifying agent being effected under conditions such that the adsorbed first sterol compound is not desorbed from the silica but substantially all of the reactive sites on the surface of the silica not covered by the adsorbed sterol compound react with the surface-modifying agent;

(c) desorbing the first sterol compound from the silica, thereby producing a surface-modified silica; and (d) contacting the surface-modified silica from step (c) with the liquid comestible mixture under conditions effective to permit adsorption of at least one second sterol compound on to the silica, thereby producing a liquid comestible mixture having a reduced content of the at least one second sterol compound.

This invention also provides a process for separation of at least one sterol compound from a fluid mixture, this process comprising contacting the fluid mixture with a surface-modified adsorbent under conditions effective to cause selective adsorption of the at least one sterol compound from the fluid mixture on to the surface-modified adsorbent, this surface-modified adsorbent having bonded to its surface a layer of elongate hydrophobic chains, said layer being interrupted by cavities shaped so as to selectively adsorb the at least one sterol compound.

This invention also provides a process for separation of at least one sterol compound from a comestible material, this process comprising:

(a) treating an adsorbent with a first sterol compound capable of becoming adsorbed on the surface of the adsorbent, this treatment being effected under conditions effective to cause the first sterol compound to become reversibly adsorbed on the surface of the adsorbent, thereby producing a sterol-modified adsorbent;

(b) treating the sterol-modified adsorbent produced in step (a) with an excess of a surface-modifying agent, this surface-modifying agent having a reactive group capable of reacting with the surface of the adsorbent, and an elongate hydrophobic portion, the treatment of the sterol-modified adsorbent with the surface-modifying agent being effected under conditions such that the adsorbed first sterol compound is not desorbed from the adsorbent but substantially all of the reactive sites on the surface of the adsorbent not covered by the adsorbed sterol compound react with the surface-modifying agent;

(c) desorbing the first sterol compound from the adsorbent, thereby producing a surface-modified adsorbent;

(d) contacting the comestible material with a solvent under conditions such that the solvent dissolves at least one sterol compound from the comestible material, thereby producing sterol-laden solvent; and (e) contacting the surface-modified adsorbent from step (c) with the sterol-laden solvent produced in step (d) under conditions effective to permit adsorption of at least one sterol compound on to the adsorbent, thereby producing a solvent having a reduced content of the at least one sterol compound.

The term "sterol compound" is used herein to mean cholesterol and its derivatives, metabolites and enzymatic degradation products, and also includes plant sterols and the oxidized forms of such plant sterols, provided that such compounds have a molecular shape which is sufficiently similar to that of cholesterol that the sterol compounds can be adsorbed into cavities of such a shape that they can adsorb cholesterol itself. Thus, the term "sterol compound" includes many cholesterol 3-esters, but excludes those long chain fatty acid 3-esters in which the alkyl chain is so long that the compounds are not adsorbed into cavities which will adsorb cholesterol itself.

The "first sterol compound" used in the process of the present invention to prepare the surface-modified adsorbent may be the same as, or different from, the second sterol compound(s) which are separated from mixtures using this surface-modified adsorbent. For example, in the Examples below, a cholesterol 3-ester is used to prepare a surface-modified adsorbent, which is then used to separate cholesterol itself from a liquid mixture. In other cases, it may be possible to use, for example, cholesterol itself to prepare a surface-modified adsorbent, and to use this surface-modified adsorbent to remove cholesterol from a liquid mixture.

It will be apparent from the foregoing summary of this invention that there are two main variants of the process of the invention. In the first variant, the surface-modified adsorbent is contacted directly with the fluid mixture from which a sterol compound is to be removed; this variant will hereinafter be referred to as the "direct" process of the invention. In the second variant, a solvent is used to remove a sterol compound from the fluid mixture and the surface-modified adsorbent is thereafter contacted with the sterol-laden solvent; this variant will hereinafter be referred to as the "indirect" process of the invention.

DETAILED DESCRIPTION OF THE INVENTION

As already mentioned, the present invention provides a process for separation of a sterol compound from a fluid mixture using a surface-modified adsorbent. This surface-modified adsorbent is prepared by treating an adsorbent with a first sterol compound capable of reacting with the surface of the adsorbent under conditions effective to cause the sterol compound to become reversibly adsorbed on the surface of the adsorbent, thereby producing a sterol-modified adsorbent on to the surface of which the first sterol compound is reversibly adsorbed, as illustrated at B in the accompanying FIG. 1, in which "CDDC" represents 3-cholesteryl 3,6-dioxadecyl carbonate, a preferred sterol compound for use in the process.

The sterol-modified adsorbent thus produced is then treated with an excess of a surface-modifying agent, which has both a reactive group capable of reacting with the surface of the adsorbent, and an elongate hydrophobic portion, so that the sterol compound stays adsorbed on the adsorbent but substantially all of the reactive sites on the surface of the adsorbent not covered by the adsorbed sterol compound react with the surface-modifying agent. The resultant product is shown schematically at C in FIG. 1, from which it will be seen that the adsorbed molecules of the sterol compound (which in practice are separated from one another by several angstroms), are each surrounded by the elongate hydrophobic chains of the surface-modifying agent. It should be noted that, in contrast to the sterol compound, which is only adsorbed on to the surface of the adsorbent, the surface-modifying agent needs to be firmly bonded to the adsorbent surface, normally by means of ionic and/or covalent bonds. In practice, the density of the surface-modifying agent on the adsorbent surface is such that the hydrophobic chains are close-packed, producing an organized and immobilized two-dimensional phase surrounding the molecules of sterol compound, so that the surface-modifying agent and the sterol compound in effect form a two-dimensional clathrate.

Next, the first sterol compound is desorbed from the adsorbent, thereby producing a surface-modified adsorbent, as illustrated at D in FIG. 1. Such desorption is typically achieved by contacting the adsorbent with a solvent in which the first sterol compound is freely soluble. The desorption of the sterol compound leaves the surface-modified adsorbent with an organized and immobilized two-dimensional phase surrounding "holes" or vacancies which are especially shaped to fit the sterol compound which has been removed therefrom. (And since the sterol compounds used in the process of the present invention are chosen to have a molecular shape similar to that of cholesterol itself, these vacancies will also be especially shaped to fit cholesterol and similar molecules.) Hence, when the surface-modified adsorbent is placed in contact with a sterol-containing liquid, such as a foodstuff, the surface-modified adsorbent adsorbs sterol compounds (designated "CHOL" in FIG. 1) in a highly selective manner, since only cholesterol or a molecule having a very similar size and shape is capable of entering the vacancies left behind when the sterol compound is desorbed. The process is analogous to that by which molecular sieves can adsorb molecules of a particular size and shape from complex mixtures, and indeed the surface-modified adsorbent may be regarded as analogous to a two-dimensional molecular sieve.

(It will be apparent to those skilled in thermodynamics that in practice, the hydrophobic chains on the surface-modified adsorbent are unlikely to retain their original positions exactly, as shown at D in FIG. 1, since entropy considerations would suggest that the hydrophobic chains would tend to enter into the vacancies. However, since the chains are bound to the surfaces at their bases, even if the chains do tend to enter the vacancies, free energy considerations will be such that the "wandering" chains will readily leave the vacancies when a sterol compound molecule is available for adsorption therein.)

Thus, exposing the surface-modified adsorbent to a sterol-containing fluid mixture results in highly selective adsorption of sterol compounds into the vacancies on the adsorbent surface, leaving the fluid mixture depleted in sterol compounds. The sterol-depleted mixture can then be physically separated from the sterol-laden adsorbent, and the sterol compounds removed from the adsorbent by contacting the adsorbent with a solvent in which the sterol compounds are readily soluble.

Especially where the surface-modified adsorbent is to come into direct contact with food materials (as, for example, when the direct method of the present invention is to be used to reduce the sterol level in egg yolks), the preferred adsorbent for use in the present process is silica. Silica having highly adsorbent surfaces is readily available commercially in forms having low levels of impurities, and such grades of silica are approved for direct contact with food. Other adsorbents useful in the present process include, for example, substantially insoluble carbonates, such as calcium carbonate and magnesium carbonate, and these carbonates are also safe for contact with foodstuffs. Processes using substantially insoluble carbonates as adsorbents are described and claimed in another application by the present inventors, of even date herewith, and entitled "Process for separation of sterol compounds from fluid mixtures using substantially insoluble compounds".

Obviously, the indirect process of the present invention, in which the surface-modified adsorbent is used to remove sterol compounds from a sterol-laden solvent, imposes fewer restrictions upon the nature of the adsorbent since, for example, an adsorbent which is not itself acceptable for direct contact with food may be acceptable for use in the indirect process provided that the adsorbent does not introduce unacceptable contaminants into the solvent.

The silica or other adsorbent used to prepare the surface-modified adsorbent is desirably in pulverulent form. Since the adsorption of sterol compounds is a surface phenomenon, a finely divided adsorbent should be employed so as to provide a high surface area available for adsorption per unit weight of the adsorbent. However, the adsorbent should not be so finely divided that, after the adsorbent has been loaded with sterol compounds by contact with the fluid mixture, difficulty is encountered in separating the adsorbent from the sterol-depleted mixture by, for example, filtration or centrifugation. In the case of the preferred silica adsorbent, it has been found that good results are achieved using a finely divided commercial grade of silica gel stated to have a surface area of about 500 $m^2/g$., as determined by the conventional Brunauer-Emmett-Teller test using nitrogen at $-183°$ C.

The adsorbent employed in the process of the present invention must be in a form which can adsorb sterol compounds, including the first sterol compound employed to produce the surface-modified silica, and which can react with the surface-modifying agent. In practice, when the adsorbent is silica, the available surface-modifying agents react with hydroxyl groups on the silica surface, so the silica should be in an active form in which its surface bears large numbers of hydroxyl groups. A preferred form of silica for use in the present process is silica gel. Use of ignited forms of silica, which do not possess large numbers of hydroxyl groups on their surfaces should be avoided. In addition, the silica should be free from adsorbents which might interfere with the adsorption of the sterol compound or reaction with the surface-modifying reagents; those familiar with the treatment of active silica will be familiar with methods, such as vacuum degassing or washing, which may be employed to ensure that the silica is in a proper state for use in the present process. Finally, if the silica is to be employed in the direct process of the invention, in which the surface-modified silica comes into intimate contact with the fluid mixture, it is of course essential that the silica be free from any material, for example heavy metals, which could leach into and be unacceptable in the treated mixture.

Preferred sterol compounds for use in the present process with silica adsorbents are cholesterol derivatives, especially cholesterol 3-esters, preferably esters of dibasic acids, and most desirably carbonate esters. A specific preferred ester is 2-cholesteryl 3,6-dioxadecyl carbonate; this ester has been found to adsorb and desorb readily and to produce a surface-modified silica which adsorbs cholesterol and other sterol compounds effectively and highly selectively. A specific preparation of this ester is given in Example 2 below. Since the sterol compounds are usually solids, they will normally be dissolved in a solvent before being contacted with the silica or other adsorbent: appropriate solvents for this purpose are alkanes, for example heptane. The solvent used is preferably not one in which the sterol compound is highly soluble, since if the sterol compound is too soluble, it may be highly solvated and be adsorbed by the adsorbent surface only with difficulty. For example, the preferred sterol compound 3-cholesteryl 3,6-dioxadecyl carbonate is highly soluble in diethyl ether, which makes an excellent solvent for desorption of the reagent from the silica (see below), but use of diethyl ether is not recommended for adsorption of the reagent on to the adsorbent.

In order to ensure that the surface-modified adsorbent has a high adsorption of, and a high selectivity for, sterol compounds, the amount of first sterol compound placed on the adsorbent should be carefully controlled. If too little sterol compound is placed on the surface, only a limited number of vacancies will be created on the adsorbent, and thus the surface-modified adsorbent will only adsorb a small amount of sterol compound per unit weight of adsorbent. On the other hand, if too much first sterol compound is employed, the surface of the adsorbent may become largely or completely covered with the sterol compound. In the former case, since sterol compound molecules will be adsorbed close together, treatment of the sterol-modified adsorbent with the surface-modifying agent will result in the formation of vacancies which do not have the shape of a single molecule of the sterol compound, and which will thus adsorb molecules other than sterol compounds. In the latter case, no vacancies may be formed at all.

The optimum amount of first sterol compound for treatment of a specific adsorbent may be determined by routine empirical tests, which will present no difficulty to those skilled in adsorption technology. In general, it has been found that use of a quantity of first sterol compound which provides about one molecule of the compound per 100 Å$^2$ of the surface of the adsorbent (as determined by the conventional Brunauer-Emmett-Teller test using nitrogen at $-183°$ C.) gives good results. In the case of the preferred first sterol compound, 2-cholesteryl 3,6-dioxadecyl carbonate, it has been found that the degree of coverage of a silica surface can conveniently be followed by measuring the ultra-violet adsorption of the derivative solution at 208-214 nm.

As is well known to those skilled in adsorption technology, for thermodynamic reasons the maximum amount of adsorbate per unit surface area of adsorbent normally decreases with increasing temperature. Accordingly, during the adsorption process, the temperature is desirably kept low; in practice, operating at room temperature (about 20° C.) has been found to give satisfactory results.

Once the adsorbent surface has been loaded with the desired amount of first sterol compound, the surface is contacted with the surface-modifying agent. Preferred surface-modifying agents for use in the process of the present invention are alkylhalosilanes, desirably alkyltrichlorosilanes in which the alkyl group contains at least six, and preferably at least about 12, carbon atoms. A specific preferred surface-modifying agent is octadecyltrichlorosilane, although the corresponding compounds derived from $C_{12}$-$C_{20}$ alkyl groups may also be employed. The alkylhalosilanes condense with Si-OH groups present on a silica surface with elimination of a hydrogen halide and formation of an Si-O-Si linkage, in which one silicon atom is derived from the silica and the other from the silane. Note that if the halosilane contains more than one halogen atom, multiple Si-O-Si linkages are formed to the silane silicon atom; thus, for example the preferred alkyltriohlorosilanes form linkages in which only the silicon atom marked with an asterisk is derived from the silane. These Si-O-Si linkages bind the silane silicon atom covalently to the silica, while leaving the hydrophobic "tail" of the surface-modifying agent free to extend away from the silica surface and produce the organized and immobilized two-dimensional phase surrounding the molecules of sterol compound.

For obvious reasons, it is desirable to ensure that the first sterol compound is not desorbed from the adsorbent surface while the sterol-modified adsorbent is being reacted with surface-modifying agent. Thus, the surface-modifying agent should not be added to the adsorbent in the form of a solution containing a large amount of a solvent in which the sterol compound is freely soluble, lest a substantial part of the adsorbed sterol compound be desorbed by this solvent. Provided that the sterol compound and the surface-modifying agent will not react with one another and are soluble in the same types of solvents (and the preferred 3-cholesteryl 3,6-dioxadecyl carbonate and octadecyltrichlorosilane fulfil these conditions), desorption of the sterol compound may be minimized by simply adding the solution of the surface-modifying agent directly to the mixture of the adsorbent and the solution of the sterol compound. In addition, it is desirable to minimize the time for which the surface-modifying agent is contacted with the sterol-modified adsorbent; with a silica adsorbent and a halosilane surface-modifying agent, a contact time of about 5 to about 10 minutes has been found to give good results.

The amount of the surface-modifying agent added to the sterol-modified adsorbent must be sufficient to allow substantially all of the reactive sites on the surface of the adsorbent not covered by the adsorbed sterol compound to react with the surface-modifying agent, in order that the hydrophobic chains of the surface-modifying agent may completely cover the surface of the adsorbent and surround the adsorbed sterol compound, thereby forming, after desorption of the sterol compound, vacancies well-defined to adsorb only sterol compounds; incomplete coverage of the surface of the adsorbent will leave the vacancies ill-defined, so that the adsorbent will thereafter not adsorb sterol compounds effectively, or the adsorption will lack the necessary selectivity. Since the surface-modifying agent reacts only with the surface of the adsorbent, the necessary amount of surface-modifying agent per unit weight of adsorbent varies with the surface area per unit weight of the adsorbent. However, the minimum amount of surface-modifying agent required in any particular case is readily determined by routine empirical tests, it being only necessary to determine the minimum quantity which will produce maximum sterol compound adsorption. It has been found that, for silica having a BET surface area of 500 m$^2$/g (using nitrogen at $-183°$ C.), the use of about 0.6 g. of octadecyltrichlorosilane per gram of silica gives satisfactory results. It should be noted that, because of the irregular nature of the surface of silica (and most other adsorbers) at the atomic level, the available surface area of the silica varies with the size of the molecule being adsorbed. This gives rise to the observation of an apparent surface area (for the surface-modifying agents) which is less than the actual surface area as measured by physical tests. Because of the difference between the molecular sizes of the nitrogen normally used in the BET test and the surface-modifying agents used in the present process, the difference is available surface area can become very pronounced; for example, the aforementioned silica having a BET surface area of 500 m$^2$/g has an available surface area of only 190 m$^2$/g when measured by gravimetric methods using octadecyltrichlorosilane. Consequently, it is not desirable to calculate the amount of surface-modifying agent required by dividing the normal BET surface area by the molecular cross-sectional area of a molecule of the surface-modifying agent.

After the treatment of the adsorbent with the surface-modifying agent has been completed, the first sterol compound must be desorbed from the adsorbent surface. This desorption is readily effected by contacting the surface with a solvent in which the sterol compound is readily soluble; in the case of the preferred sterol compound, 3-cholesteryl 3,6-dioxadecyl carbonate, the recommended solvent is diethyl ether. Water may be used to remove some sterol compounds. As shown in Example 5 below, desorption with diethyl ether recovers the 3-cholesteryl 3,6-dioxadecyl carbonate almost quantitatively, thereby permitting the expensive sterol compound to be used in the treatment of further batches of adsorbent.

The surface-modified adsorbent thus produced may then be employed to remove sterol compounds from comestible liquid and other fluid mixtures. The "comestible liquid mixtures" used in the process of the present invention include not only foodstuffs, for example egg yolk, which are inherently liquid, but also solid or semi-solid foodstuffs, for example solid animal fats such as lard, which can be made in a liquid form by dissolving them in an appropriate solvent which does not interfere with the sterol-removal process. The same surface-modified adsorbent can be used to remove sterol compounds from sterol-laden solvents, such as supercritical carbon dioxide.

To ensure maximum removal of sterol compounds from the fluid mixture, it is of course necessary to ensure that the mixture is intimately contacted with the surface-modified adsorbent. Although, at least in theory, the necessary intimate contact could be achieved by passing the fluid mixture through a column of the surface-modified adsorbent, so that the surface-modified adsorbent forms the stationery phase of the system, in practice such a column separation process is undesirable for many fluid mixtures, especially foodstuffs. Many foodstuffs, such as egg yolk, are proteinaceous and highly viscous. The pressures necessary to force such viscous liquids through columns of surface-modified adsorbent at the rates required for practice of this invention on a commercial scale are high, and consequently, the fluid mixture will be exposed to large shear forces as it passes through the column. Such large shear forces may have undesirable effects upon the proteins present in the fluid.

To avoid such problems in column treatment, as already mentioned it is normally preferred to carry out the process of the present invention with the surface-modified adsorbent in pulverulent form, thoroughly admixing this pulverulent adsorbent with the fluid mixture, and then separating the sterol-laden adsorbent from the sterol-reduced fluid mixture by, for example, filtration or centrifugation. The separated sterol-laden adsorbent can then have the sterol compounds desorbed therefrom in a manner similar to that in which the first sterol compound is desorbed during preparation of the surface-modified adsorbent (for example, by contacting the sterol-laden adsorbent with diethyl ether), and the surface-modified adsorbent recycled for use in treating further batches of fluid mixture. If desired, the sterol compounds can be recovered from the diethyl ether or other solvent.

The following Examples are now given, though by way of illustration only, to show details of preferred reagents, conditions and techniques used in the process of the present invention. Unless otherwise stated, all parts are by weight.

EXAMPLE 1 (CONTROL)

This Example illustrates that a silica surface which is treated with a alkylhalosilane without first having a sterol compound adsorbed thereon does not selectively adsorb cholesterol.

A 1 gram aliquot of a commercial, 70-230 U.S. mesh silica gel (SiO$_2$) with a BET surface area (measured using nitrogen at $-183°$ C.) of about 500 m$^2$/g was contacted with a solution of 2.5 g. of octadecyltrichlorosilane in 20 mL of dry heptane contained in a capped, 20 mL glass bottle containing a magnetic stirrer. Bubbles of hydrogen chloride gas evolved from the solution upon mixing. After stirring for 3-4 hours, the solid product was recovered by filtration, washed with dry hexane, and further dried under vacuum.

Seven replications of the experiment displayed an average sample weight gain of 0.4446 g. per gram of silica starting material. Assuming monolayer coverage of the silica surface by the silane, and using the commonly accepted cross-section value of 2 nm$^2$ per alkyl chain, this weight gain corresponds to an available surface area of 191 square meters per gram for the silica starting material.

The surface of the surface-modified silica so produced is believed to be completely covered with a close-packed array of alkyl chains. This silica is buoyant in contact with water, in contrast to the silica starting material, which is denser than water and therefore sinks. Moreover, this surface-modified silica shows no ability to bind or adsorb cholesterol from heptane solution.

EXAMPLE 2: SYNTHESIS OF 3-CHOLESTERYL 3,6-DIOXADECYL CARBONATE

This Example illustrates the synthesis of the preferred sterol compound for use in the process of the present invention.

A solution of 4.49 g. (0.010 mole) of cholesteryl chloroformate in a minimum amount of chloroform was added to a solution of 1.62 g (0.01 mole) of 2(2-butoxyethoxy)ethanol and 1.2 g (0.015 mole) of pyridine in 20 mL of chloroform and the resultant solution stirred at ambient temperature for 12 hours. The solution was then washed with 5 percent hydrochloric acid and with water and dried over anhydrous sodium sulfate. Filtration, evaporation, and chromatography of the residue over silica gel (12:1, hexane:ethyl acetate eluent) afforded a pure sample of the sterol compound, 3-cholesteryl 3,6-dioxadecyl carbonate (hereinafter referred to as "CDDC") as a clear, viscous liquid.

EXAMPLE 3: ADSORPTION OF STEROL COMPOUND ON SILICA

This Example illustrates the adsorption of the CDDC prepared in Example 2 above on the same silica gel as used in Example 1 above.

1.0 G. of the same silica gel as in Example 1 above was added to a solution of 0.1170 g (0.2 mmole) of the CDDC prepared in Example 2 in 10 of mL heptane and the resultant slurry was stirred for 12 hours. The solution concentration of CDDC, as determined by the value of its UV absorption at 208-214 nm, was found to decrease during the first few hours of stirring and to reach a steady state value which indicated positive adsorption.

This example shows that the sterol compound readily adsorbs from heptane on to the virgin silica gel surface to produce sub-monolayer coverage.

EXAMPLE 4: SURFACE MODIFICATION OF SILICA WITH OCTADECYLTRICHLOROSILANE

This Example illustrates the reaction of the sterol-modified silica produced in Example 3 with a surface-modifying agent.

The slurry of sterol-modified silica gel and 0.1170 g CDDC in 10 mL heptane produced in Example 3 above was diluted with a solution of 0.6150 g octadecyltrichlorosilane (OTS) in a minimum amount of heptane. After stirring for five minutes, the resultant solid was allowed to settle, the heptane solution decanted, and the remaining solid washed with fresh heptane. Filtration and subsequent vacuum drying afforded the sterol-laden surface-modified silica product as a fine white powder.

EXAMPLE 5: DESORPTION OF STEROL COMPOUND AND FORMATION OF FINAL SURFACE-MODIFIED SILICA

This Example illustrates desorption of the sterol compound from the sterol-laden surface-modified silica product produced in Example 4 above to produce the final surface-modified silica having sterol-removal capacity.

1 G. of the white powder prepared in Example 4 above and 0.01 g of triphenylmethane were added to 20 mL of diethyl ether and the resultant slurry was warmed to 35° C. for 30 minutes. (The triphenylmethane was added as a tracer for experimental purposes to enable the percentage recovery of the CDDC to be determined, and took no part in the desorption procedure. The triphenylmethane would not be present in commercial practice of the process of the present invention.) The liquid phase remaining after the heating was removed by means of a pipet and evaporated to dryness. The resultant residue was then analyzed by quantitative proton nuclear magnetic resonance spectroscopy and the mole ratio of CDDC to triphenylmethane determined. Using the weight of added triphenylmethane as a standard, the amount of desorbed CDDC was found to be nearly equal to that originally used to treat the starting silica gel. Since the CDDC is recovered unchanged, it may be reused to treat further batches of silica gel, thereby serving as a catalytic agent for the preparation the surface-modified silica.

From five independent measurements, namely the amount of CDDC used, the amount of CDDC recovered, the silica weight gain following the OTS treatment, and the percentages of carbon and hydrogen in the final surface-modified silica, the loading capacity of the surface-modified silica was calculated to be $0.13 \pm 0.06$ gram cholesterol per gram of surface-modified silica (i.e. 0.13 g/g solid is the theoretical cholesterol binding capacity of the surface-modified silica prepared as described above).

EXAMPLE 6: REMOVAL OF CHOLESTEROL FROM MIXTURE BY SURFACE-MODIFIED SILICA

This Example demonstrates the cholesterol adsorption capacity of the surface-modified silica produced in Example 5 above.

A 1 g. sample of the surface-modified silica prepared in Example 5 above was stirred for 18 hours with 20 mL of a heptane solution containing 18 mM of cholesterol. The solid was recovered by filtration and dried under vacuum. A weighed sample of triphenylmethane was then added to the solid along with 20 mL of diethyl ether (the triphenylmethane was added for tracer purposes for the same reasons as in Example 5 above, and would not be used in the commercial practice of the process of the present invention). The resultant slurry was warmed to 35° C. with stirring for 30 minutes and filtered. The ether solution was evaporated to dryness and analyzed by quantitative proton NMR spectroscopy to assay for cholesterol. (The mole ratio of cholesterol to triphenylmethane is conveniently determined, and the absolute amount of cholesterol found relative to the amount of triphenylmethane introduced as a tracer.) The cholesterol loading determined by this procedure was 0.17 grams per gram of solid host or equal, within experimental error, to the loading determined theoretically (see Example 5) above.

This Example, together with Example 5, shows that cholesterol is recognized by the surface-modified silica, and can be adsorbed and desorbed by simple procedures. Since cholesterol is not adsorbed by a silica surface which has been completely covered with octadecylsilane chains (cf. Example 1 above), it follows that the cholesterol is not adsorbed on the network of alkyl chains which cover much of the silica surface, but rather occurs at the special shape-recognizing sites created by the original sterol compound molecules. Since the original sterol compound molecules could be removed to produce the surface-modified silica in a form ready for adsorption of cholesterol or other sterol compounds, it follows that the surface-modified silica has good stability and can be used repeatedly in a cyclic process to remove sterol compounds from fluid mixtures.

EXAMPLE 7: REMOVAL OF STEROL COMPOUNDS FROM SUPERCRITICAL CARBON DIOXIDE

This Example illustrates schematically the way in which the surface-modified silica produced in Example 5 above could be used to remove sterol compounds from supercritical carbon dioxide, which has itself been used to extract sterol compounds from a foodstuff.

Figures 1A, 1B:
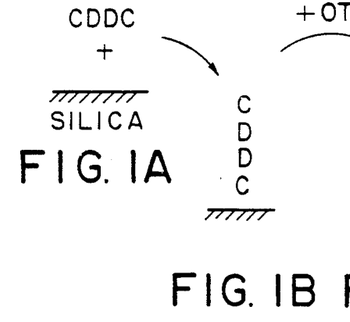
FIG. 1 of the accompanying drawings shows schematically the manner in which the surface-modified silica used in the process of the present invention is prepared and used to separate sterol compounds from a liquid comestible mixture.
Figure 1C:
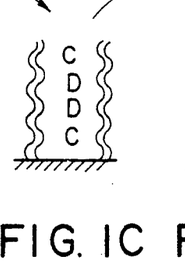
Figure 1D:
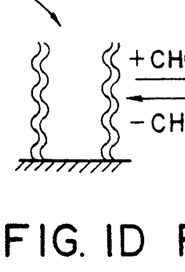
Figure 1E:
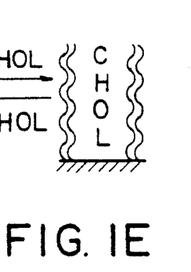
Figure 2:
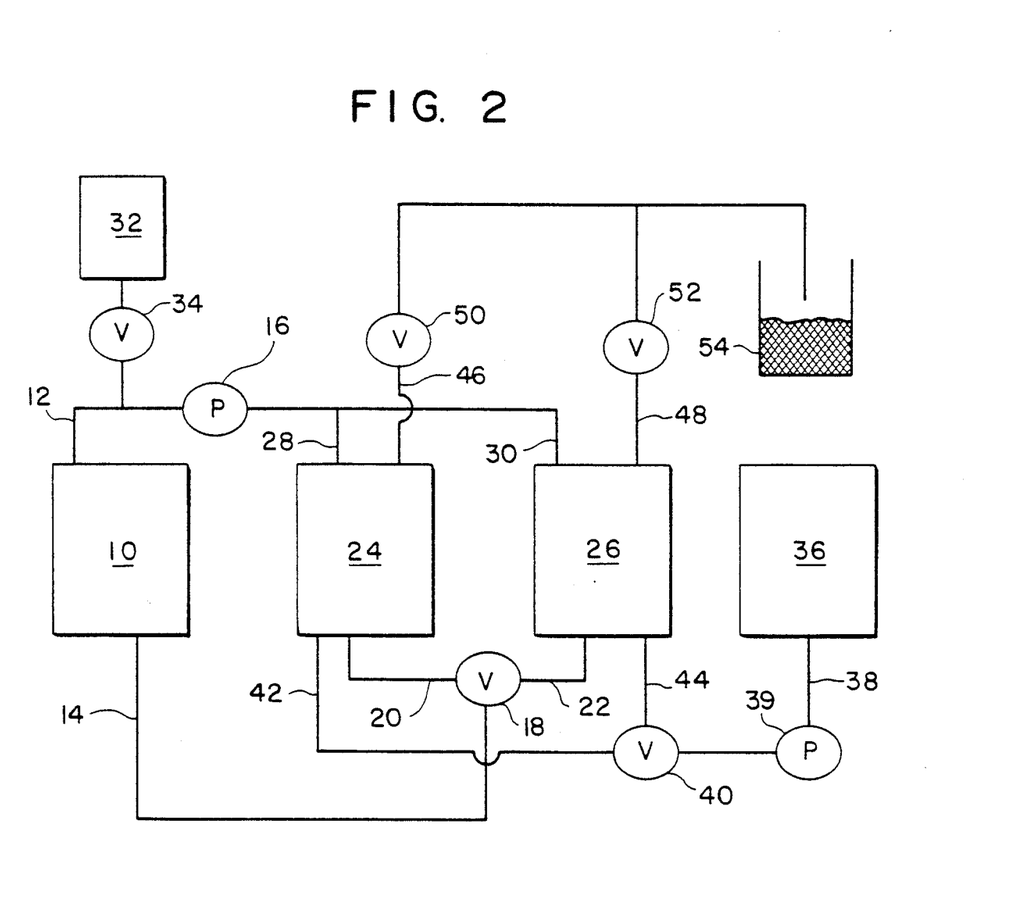
FIG. 2 is a highly schematic representation of an apparatus for carrying out the indirect process of the invention.

The apparatus used in this process is shown in a highly schematic manner in FIG. 2 of the accompanying drawings. In this Figure, the foodstuff to be treated is place in a vessel 10 provided with an inlet line 12 and an outlet line 14. Supercritical carbon dioxide is pumped by means of a pump 16 from the inlet line 12 through the vessel 10 and into the outlet line 14.

In practice, as for example when the treatment of the foodstuff is effected in the manner described in the aforementioned U.S. Pat. No. 4,692,280, the apparatus used to contact the carbon dioxide with the foodstuff may be considerably more complicated than a simple vessel 10 and may include numerous interconnected vessels, lines, etc. However, in so far as the modification of such a process effected by the present invention is concerned, any process for treatment of a foodstuff with supercritical carbon dioxide may conceptually be regarded as taking place in a closed vessel which receives "clean" carbon dioxide at an inlet and expels sterol-laden carbon dioxide at an outlet.

The outlet line 14 is connected to a two-way valve 18, which has outlets connected via lines 20 and 22 to recovery vessels 24 and 26 respectively, these vessels both being filled with the surface-modified silica produced in Example 5 above. These vessels 24 and 26 each have an outlet connected via a line 28 or 30 to the inlet of the pump 16.

To make up the inevitable small losses of carbon dioxide, the apparatus is provided with a carbon dioxide reservoir 32, which is connected via a valve 34 to the line 12.

A reservoir 36 is connected via a line 38 provided with a pump 39 to a two-way valve 40, the outlets of which are connected via lines 42 and 44 to the recovery vessels 24 and 26 respectively. The recovery vessels have outlets connected via lines 46 and 48 respectively, provided with check valves 50 and 52 respectively, to a waste solvent collection vessel 54.

The apparatus shown in FIG. 2 is used in the following manner. The foodstuff to be treated is placed in the vessel 10 and supercritical carbon dioxide is circulated through the foodstuff by means of the pump 16. Sterol-laden carbon dioxide leaves the vessel 10 via the outlet line 14, and when this sterol-laden carbon dioxide reaches the valve 18, it is initially routed via the line 20 to the recovery vessel 24. As the carbon dioxide passes through the vessel 24, most of the sterol compounds in the carbon dioxide are adsorbed by the surface-modified silica in the vessel 24, so that substantially sterol-free carbon dioxide leaves the vessel 24 via the line 28, and is recirculated by the pump 16 back to the vessel 12.

This process continues (in normal practice, with occasional replacement of the foodstuff in the vessel 10 with further batches of foodstuff) until the surface-modified silica in the vessel 24 is laden with almost its maximum amount of sterol compounds. At this time, the valve 18 is shifted to its other position, so that sterol-laden carbon dioxide from the line 14 is routed via the line 22, the recovery vessel 26 (where most of the sterol compounds are removed), the line 30 and the pump 16 back to the vessel 10.

To remove the sterol compounds from the surface-modified silica in the vessel 24 and thus prepare the silica for reuse, the vessel 36 is filled with diethyl ether or another appropriate solvent and this solvent is pumped by the pump 39 along the line 38 to the valve 40, which is set to route the ether along the line 42 to the recovery vessel 24. The ether desorbs the sterol compounds from the silica in the vessel 24, and the resulting sterol-laden ether passes along the line 46, though the check valve 50 and into the waste reservoir 54. (Obviously, if diethyl ether or another highly inflammable solvent is being used, appropriate precautions should be taken to ensure that the ether in the reservoir 54 does not ignite.) The check valve 52 serves to prevent backflow of the ether into the recovery vessel 26. If desired, the sterol-laden ether in the reservoir 54 may be distilled or otherwise treated to remove the sterol compounds therefrom, thereby permitting reuse of the ether.

When the surface-modified silica in the vessel 26 becomes laden with almost its maximum amount of sterol compounds, the valve 18 is again shifted to route the carbon dioxide from the line 14 to the vessel 24, and the valve 40 is shifted to its other position, so that the ether passes through the vessel 26 and desorbs the sterol compounds from the silica in that vessel.

From the foregoing, it will be seen that the apparatus shown in FIG. 2 allows continuous extraction of sterol compounds from foodstuffs using supercritical carbon dioxide without the need for evaporation and recondensation of the carbon dioxide between passes through the foodstuff. Accordingly, the process of the present invention just described with reference to FIG. 2 incurs much lower energy costs than conventional processes employing supercritical carbon dioxide to remove sterol compounds from foodstuffs.

We claim:

1. A process for separation of at least one sterol compound from a fluid comestible mixture, said process comprising:
   (a) treating an adsorbent in pulverulent form with a first sterol compound capable of becoming adsorbed on the surface of the adsorbent, said treatment being effected under conditions effective to cause the first sterol compound to become reversibly adsorbed on the surface of the adsorbent, thereby producing a sterol-modified adsorbent;
   (b) treating the sterol-modified adsorbent produced in step (a) with an excess of a surface-modifying agent, the surface-modifying agent having a reactive group capable of reacting with the surface of the adsorbent, and an elongate hydrophobic portion, the treatment of the sterol-modified adsorbent with the surface-modifying agent being effected under conditions such that the adsorbed first sterol compound is not desorbed from the adsorbent but substantially all of the reactive sites on the surface of the adsorbent not covered by the adsorbed sterol compound react with the surface-modifying agent;

(c) desorbing the first sterol compound from the adsorbent, thereby producing a surface-modified adsorbent; and (d) contacting the surface-modified adsorbent from step (c) with the fluid mixture under conditions effective to permit adsorption of at least one second sterol compound on to the adsorbent and separating the surface-modified adsorbent from the fluid mixture, thereby producing a fluid mixture having a reduced content of the at least one second sterol compound.

2. A process according to claim 1 wherein the fluid mixture is a liquid comestible mixture comprising cholesterol and at least one protein.

3. A process according to claim 2 wherein the liquid comestible mixture comprises egg yolk.

4. A process according to claim 1 wherein the first sterol compound is cholesterol or a derivative thereof.

5. A process according to claim 4 wherein the first sterol compound is a cholesterol 3-ester.

6. A process according to claim 5 wherein the cholesterol 3-ester is 3-cholesteryl 3,6-dioxadecyl carbonate.

7. A process according to claim 1 wherein the surface-modifying agent is a alkylhalosilane.

8. A process according to claim 1 wherein, in step (c), the desorption of the first sterol compound from the adsorbent is effected by contacting the adsorbent with a solvent in which the first sterol compound is soluble.

9. A process according to claim 1 wherein, following step (d), the fluid mixture having a reduced content of the at least one second sterol compound is separated from the adsorbent, the adsorbent is treated to remove at least part of the sterol compound(s) therefrom, and the treated adsorbent is thereafter contacted with a second portion of the fluid mixture.

10. A process according to claim 9 wherein the surface-modified adsorbent is in pulverulent form and is mixed with the fluid mixture, and the resultant mixture of fluid mixture and pulverulent adsorbent is thereafter separated by filtration or centrifugation.

11. A process according to claim 1 wherein the adsorbent comprises silica.

12. A process according to claim 11 wherein the silica is a silica gel having an average particle size of less than about 70 U.S. mesh.

13. A process according to claim 11 wherein the first sterol compound is a cholesterol 3-ester.

14. A process according to claim 13 wherein the cholesterol 3-ester is a carbonate ester.

15. A process according to claim 14 wherein the cholesterol 3-ester is 3-cholesteryl 3,6-dioxadecyl carbonate.

16. A process according to claim 11 wherein the surface-modifying agent is an alkylhalosilane.

17. A process according to claim 16 wherein the surface-modifying agent is a alkyltrichlorosilane in which the alkyl group contains at least six carbon atoms.

18. A process according to claim 17 wherein the surface-modifying agent is octadecyltrichlorosilane.

19. A process according to claim 11 wherein, following step (d), the fluid mixture having a reduced content of the at least one second sterol compound is separated from the silica, the silica is treated to remove at least part of the sterol compound(s) therefrom, and the treated silica is thereafter contacted with a second portion of the fluid mixture.

20. A process according to claim 19 wherein the surface-modified silica is in pulverulent form and is mixed with the fluid mixture, and the resultant mixture of fluid mixture and pulverulent silica is thereafter separated by filtration or centrifugation.

21. A process according to claim 11 wherein the first sterol compound is water soluble and, in step (c), the desorption of the first sterol compound from the silica is effected by contacting the silica with water.

22. A process according to claim 1 wherein the fluid mixture comprises a solvent which has been contacted with a sterol-containing foodstuff.

23. A process according to claim 22 wherein the solvent comprises liquid or supercritical carbon dioxide.

24. A process for separation of at least one sterol compound from a liquid comestible mixture, said process comprising:

(a) treating silica with a first sterol compound capable of becoming adsorbed on the surface of the silica, said treatment being effected under conditions effective to cause the first sterol compound to become reversibly adsorbed on the surface of the silica, thereby producing a sterol-modified silica;

(b) treating the sterol-modified silica produced in step (a) with an excess of a surface-modifying agent, the surface-modifying agent having a reactive group capable of reacting with the surface of the silica, and an elongate hydrophobic portion, the treatment of the sterol-modified silica with the surface-modifying agent being effected under conditions such that the adsorbed first sterol compound is not desorbed from the silica but substantially all of the reactive sites on the surface of the silica not covered by the adsorbed sterol compound react with the surface-modifying agent;

(c) desorbing the first sterol compound from the silica, thereby producing a surface-modified silica; and (d) contacting the surface-modified silica from step (c) with the liquid comestible mixture under conditions effective to permit adsorption of at least one second sterol compound on to the silica and separating the surface-modified silica from the liquid comestible mixture, thereby producing a liquid comestible mixture having a reduced content of the at least one second sterol compound.

25. A process according to claim 24 wherein the silica is a silica gel having an average particle size of less than about 70 U.S. mesh.

26. A process according to claim 24 wherein the hydrophobic chains are bonded to the surface of the silica via Si-O-Si linkages.

27. A process according to claim 26 wherein the hydrophobic chains are alkyl groups each containing at least six carbon atoms, and each alkyl group has attached to one end thereof a silicon atom, said silicon atom being bonded to the surface of the silica via three Si-O-Si linkages.

28. A process according to claim 27 wherein the alkyl groups are octadecyl groups.

29. A process according to claim 24 wherein the liquid comestible mixture comprises cholesterol and at least one protein.

30. A process according to claim 29 wherein the liquid comestible mixture comprises egg yolk.

31. A process according to claim 24 wherein, following step (d), the liquid comestible mixture having a reduced content of the at least one second sterol compound is separated from the silica, the silica is washed to remove at least part of the sterol compound(s) therefrom, and the washed silica is thereafter contacted with a second portion of the liquid comestible mixture.

32. A process according to claim 31 wherein the surface-modified silica is in pulverulent form and is mixed with the liquid comestible mixture, and the resultant mixture of liquid comestible mixture and pulverulent silica is thereafter separated by filtration or centrifugation.

33. A process for separation of at least one sterol compound from a fluid mixture, said process comprising contacting the fluid mixture with a surface-modified silica adsorbent under conditions effective to cause selective adsorption of at least one sterol compound from the fluid mixture on to the surface-modified adsorbent, said surface-modified adsorbent, said surface-modified adsorbent having bonded to its surface a layer of elongate hydrophobic chains, said layer being interrupted by cavities shaped so as to selectively adsorb the at least one sterol compound and separating the surface-modified adsorbent from the fluid mixture.

34. A process according to claim 33 wherein said hydrophobic chains are bonded to the surface of the silica via Si-O-Si linkages.

35. A process according to claim 34 wherein said hydrophobic chains are alkyl groups each containing at least six carbon atoms, and each alkyl group has attached to one end thereof a silicon atom, said silicon atom being bonded to the surface of the silica via three Si-O-Si linkages.

36. A process according to claim 35 wherein the alkyl groups are octadecyl groups.

37. A process according to claim 33 wherein the fluid mixture is a liquid comestible mixture comprising cholesterol and at least one protein.

38. A process according to claim 37 wherein the liquid comestible mixture comprises egg yolk.

39. A process according to claim 33 wherein the fluid mixture comprises ligand or supercritical carbon dioxide.

40. A process for separation of at least one sterol compound from a comestible material, said process comprising:

(a) treating a silica adsorbent with a first sterol compound capable of becoming adsorbed on the surface of the adsorbent, said treatment being effected under conditions effective to cause the first sterol compound to become reversibly adsorbed on the surface of the adsorbent, thereby producing a sterol-modified adsorbent;

(b) treating the sterol-modified adsorbent produced in step (a) with an excess of a surface-modifying agent, said surface-modifying agent having a reactive group capable of reacting with the surface of the adsorbent, and an elongate hydrophobic portion, the treatment of the sterol-modified adsorbent with the surface-modifying agent being effected under conditions such that the adsorbed first sterol compound is not desorbed from the adsorbent but substantially all of the reactive sites on the surface of the adsorbent not covered by the adsorbed sterol compound react with the surface-modifying agent;

(c) desorbing the first sterol compound from the adsorbent, thereby producing a surface-modified adsorbent;

(d) contacting the comestible material with a solvent under conditions such that the solvent dissolves at least one sterol compound from the comestible material, thereby producing sterol-laden solvent; and (e) contacting the surface-modified adsorbent from step (c) with the sterol-laden solvent produced in step (d) under conditions effective to permit adsorption of at least one sterol compound on to the adsorbent, and separating the surface-modified adsorbent from the solvent, thereby producing a solvent having a reduced content of the at least one sterol compound.

41. A process according to claim 40 wherein the solvent having a reduced content of the at least one sterol compound produced in step (e) is thereafter contacted with a second portion of the comestible material under conditions such that the solvent dissolves at least one sterol compound from the comestible material.

42. A process according to claim 40 wherein the solvent comprises liquid or supercritical carbon dioxide.

43. A process according to claim 40 wherein the comestible material comprises egg yolk or fish oil.

* * * * *